United States Patent [19]

Hughes et al.

[11] Patent Number: 5,297,765
[45] Date of Patent: Mar. 29, 1994

[54] TURBINE ENGINE NACELLE LAMINAR FLOW CONTROL ARRANGEMENT

[75] Inventors: Kevin A. Hughes; Chih F. Shieh, both of San Diego, Calif.

[73] Assignee: Rohr, Inc., Chula Vista, Calif.

[21] Appl. No.: 970,058

[22] Filed: Nov. 2, 1992

[51] Int. Cl.$^5$ .............................................. B64C 21/06
[52] U.S. Cl. ..................................... 244/209; 244/208; 244/130
[58] Field of Search ............... 244/209, 208, 130, 1 N, 244/53 B; 60/39.07

[56] References Cited

U.S. PATENT DOCUMENTS

| | | | |
|---|---|---|---|
| 2,925,231 | 2/1960 | Pfaff, Jr. et al. | 244/209 |
| 3,128,973 | 4/1964 | Dannenberg | 244/209 X |
| 4,749,150 | 6/1988 | Rose et al. | 244/130 X |
| 5,141,182 | 8/1992 | Coffinberry | 244/209 |

FOREIGN PATENT DOCUMENTS

| | | | |
|---|---|---|---|
| 1232476 | 1/1967 | Fed. Rep. of Germany | 244/209 |
| 0934381 | 5/1948 | France | 244/209 X |

Primary Examiner—Margaret A. Focarino
Assistant Examiner—Christopher P. Ellis
Attorney, Agent, or Firm—Patrick J. Schlesinger; Frank D. Gilliam

[57] ABSTRACT

A laminar flow control arrangement for use in a nacelle for an aircraft turbine engine. The nacelle has a microporous outer skin in the area where air flow over the skin is to be maintained in laminar flow. A honeycomb core is bonded to the inner surface of the nacelle skin. A perforated back skin is bonded to the inner surface of the core. Several closely spaced circumferential flutes open to the back skin are fastened to the back skin. At least one collector duct is connected to the flutes and a suction pump. In operation, the suction pump pulls air through the ducts and flutes, causing air to be sucked inwardly through the microporous skin thereby maintaining laminar, rather than turbulent, flow over a large part of the nacelle during aircraft take-off and cruise operation. In addition, a chamber is preferably provided in communication with any gaps in the nacelle skin in the area where laminar flow is desired. Air is sucked through said gap and adjacent chamber to avoid disruption of laminar flow by the gap. A significant reduction in drag results for a nacelle incorporating the novel arrangement of the present invention.

15 Claims, 2 Drawing Sheets

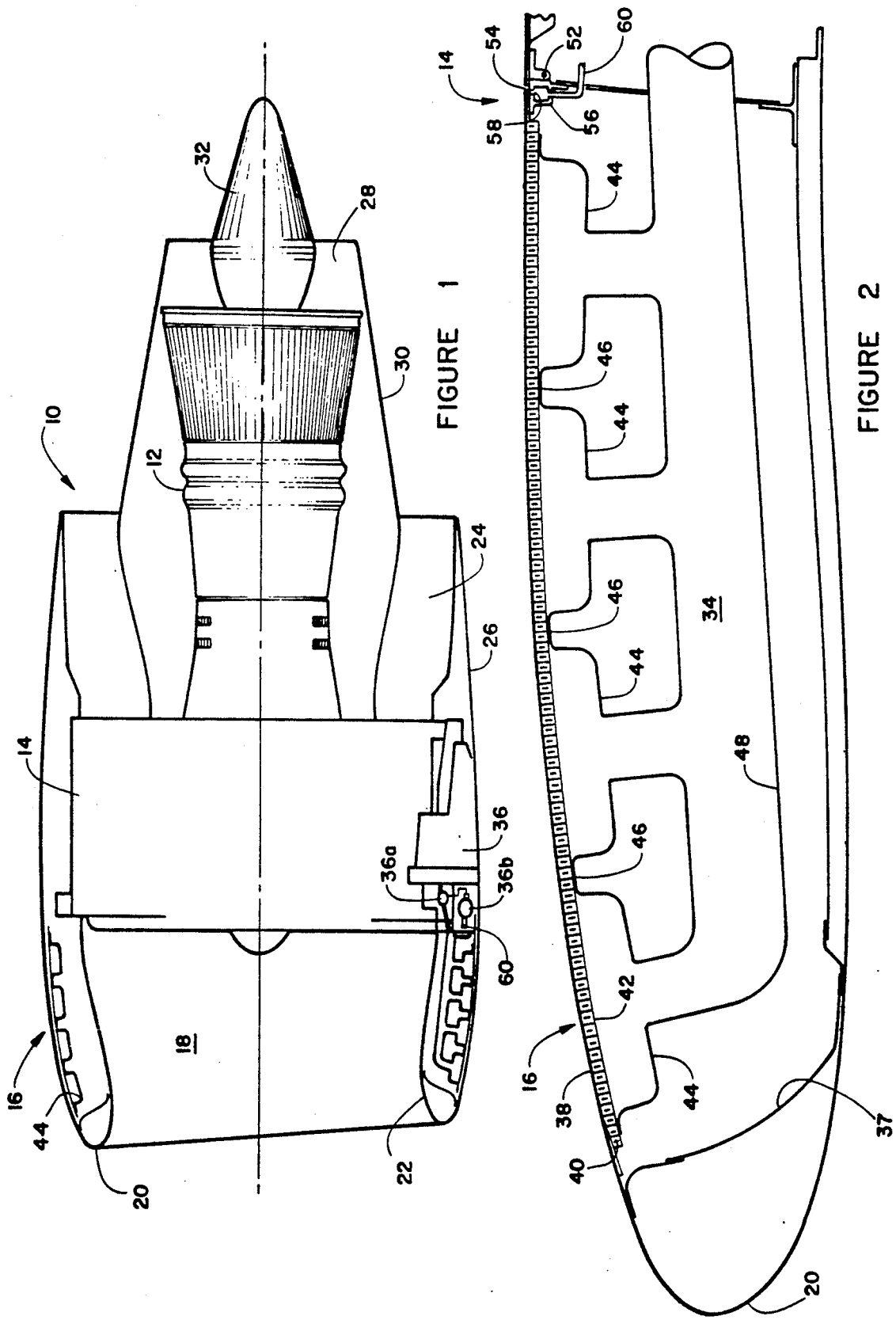

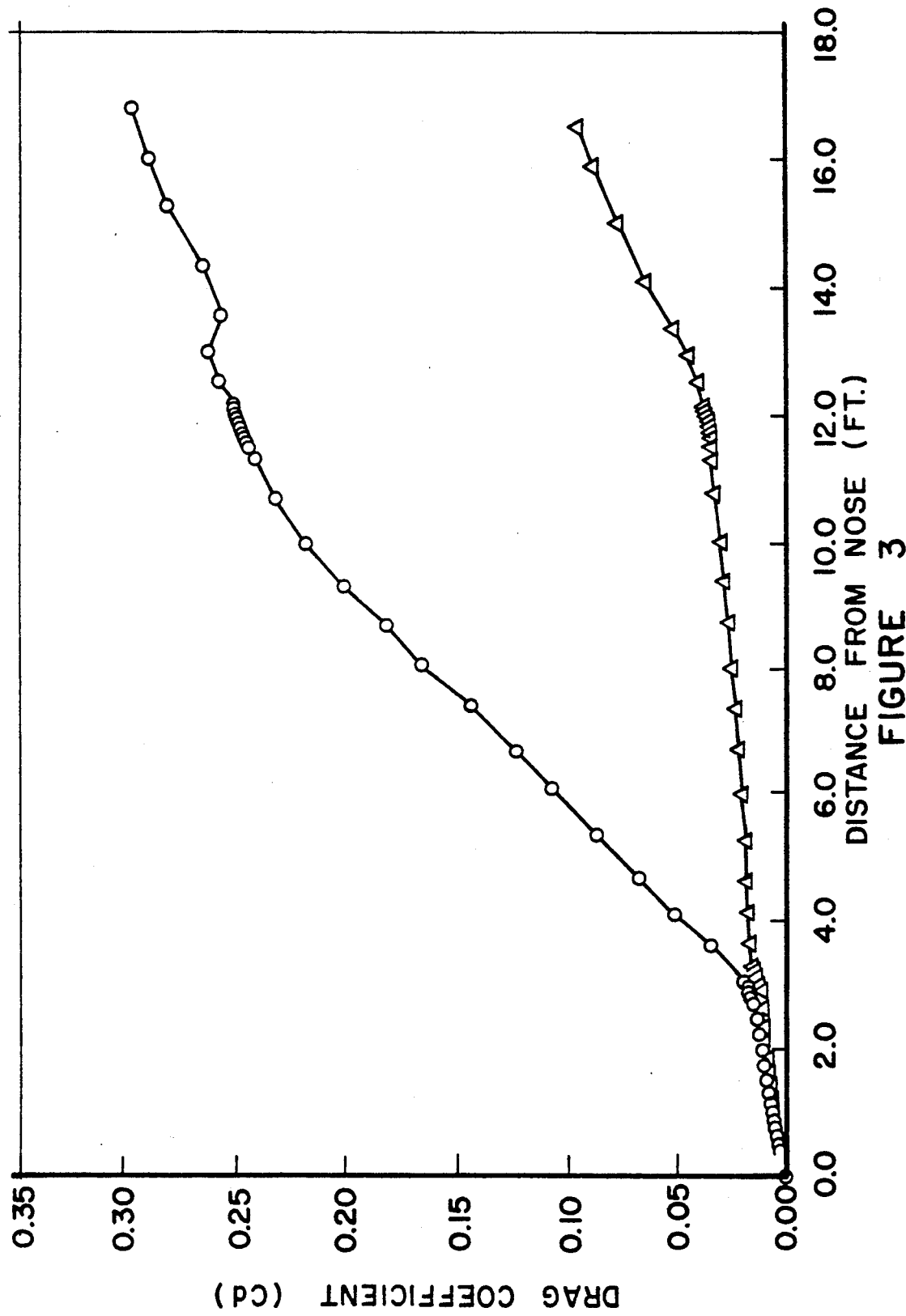

TURBINE ENGINE NACELLE LAMINAR FLOW CONTROL ARRANGEMENT

BACKGROUND OF THE INVENTION

This invention relates in general to an improvement in aircraft engine nacelles and, but not by way of limitation, more particularly, to an arrangement for maintaining laminar flow over at least a portion of a nacelle during aircraft flight to reduce drag.

Roughly half of the drag an aircraft experiences in flight is due to skin friction. Great efforts are expended in attempting to reduce drag because of the fuel savings resulting from any such reduction. It has been estimated that about 4% of the drag experienced by an aircraft using gas turbine engines mounted on the aircraft through a wing or fuselage mounted pylon results from freestream flow of air over the engine nacelle.

A large number of nacelle designs have been developed by engineers seeking to reduce nacelle drag. Nacelles have been shaped to provide maximum natural laminar flow, such as the design described by Lahti et al in U.S. Pat. No. 4,799,633. However, these designs must be optimized for either the flow characteristics resulting from cruise flight or the far different characteristics resulting from take-off conditions.

Attempts have been made to blow air out through holes in an aircraft wing to reduce drag, such as is described by Fleischmann in U.S. Pat. No. 2,873,931. Axially directed ridges have been placed on aerodynamic surface to direct air flow in a manner reducing drag, as disclosed by Rethorst in U.S. Pat. No. 3,588,005. Mechanisms within an aircraft wing have been provided to change the airfoil shape during flight to optimize the wing for flight conditions, e.g., cruise, take-off and landing, as described by Readnour et al in U.S. Pat. No. 5,000,399. While these systems often reduce drag somewhat, the improvement has not been sufficient, in view of the weight and complexity of the required apparatus, for any of them to have come into commercial use.

A great variety of structures involving sucking air inwardly through a porous aerodynamic surface have been developed and thereby endeavor to reduce drag by maintaining laminar flow along the aerodynamic surface. Typically, Dannenberg in U.S. Pat. No. 3,128,973 shows wing panels having a porous surface through which air can be drawn into the wing interior. Glaze shows, in U.S. Pat. No. 3,056,432, permeable woven wire material forming longitudinal portions of an aircraft wing skin. Prior art shows longitudinal slots in an aircraft wing through which air can be drawn into the wing interior. Although these systems may beneficially encourage laminar flow over small areas or along longitudinal lines, problems remain with obtaining uniform inward flow over large aerodynamic areas. Also, many of the prior systems for drawing air into a wing or the like present a rough surface or surface discontinuities that will tend to increase drag by causing boundary layer separation. Also, these systems are useful only over large, smooth surfaces, such as aircraft wings, and cannot accommodate turbulence inducing gaps in the surfaces, such as the inherent gaps around movable doors or panels.

Rose et al describe, in U.S. Pat. No. 4,479,150, a boundary layer control system for use in a nacelle that has a layer of honeycomb sound suppression material on the internal surface of the nacelle skin. A porous skin made up of a fine woven mesh is adhesively bonded to a perforated aluminum sheet. The honeycomb sound suppression system is bonded to the opposite side of the aluminum sheet. Suction headers engage the inside surface of the honeycomb, with an impermeable skin between headers. Honeycomb walls are partially cut-away to permit airflow through the honeycomb cell walls and the perforated sheet to reach the headers. While generally effective, this system could be improved, since the woven skin sheet does not provide optimum skin smoothness and the air flow path through the perforations, honeycomb walls and headers is less than ideal.

Thus, there is a continuing need for improvements in laminar flow control over aircraft engine nacelles, that have reduced weight and complexity, provide a smooth exterior skin surface, improve system air flow, provide uniform suction over large areas and can accommodate and protect against the turbulence inducing affects of gaps around nacelle doors and the like.

SUMMARY OF THE INVENTION

The above-noted problems, and others, are overcome in accordance with this invention by a laminar flow control arrangement for aircraft turbine engine nacelles which comprises a microporous nacelle outer skin having a honeycomb core bonded thereto and a perforated back skin bonded to the core, with an air suction system connected to the perforated back skin. The suction system comprises a plurality of closely spaced circumferential flutes fastened to, and open to, the back skin. At least one longitudinal collector duct is operatively connected to the flutes and to a suction pump so that the pump draws air through the collector ducts, flutes, honeycomb and porous skin to provide a uniform predetermined suction over a large aerodynamic area.

Typically, the honeycomb core and back skin may be formed from aluminum, graphite fiber reinforced epoxy resins, titanium or other materials suitable for the use intended. For best results the suction coefficient of the porous skin should be at least 0.0001, preferably in the range of from about 0.0001 to 0.0004. Suction coefficient is defined as the ratio of averaged normal velocity through the porous skin to the freestream velocity.

BRIEF DESCRIPTION OF THE DRAWINGS

Details of the invention, and of certain preferred embodiments thereof, will be further understood upon reference to the drawing, wherein:

FIG. 1 is a schematic elevation view, partially cut away, of an aircraft engine and nacelle utilizing the arrangement of this invention;

FIG. 2 is a schematic section view through a forward portion of a nacelle, showing the arrangement of this invention; and FIG. 3 is a chart illustrating drag reduction achievable by the arrangement of this invention.

DETAILED DESCRIPTION OF PREFERRED EMBODIMENT

Referring now to the drawings in detail and in particular to FIG. 1, there is seen a schematic elevation view of a typical aircraft turbofan engine 10 using the laminar flow control arrangement of this invention. The engine assembly includes a centrally mounted gas turbine engine 12 that drives a large by-pass fan (not seen) within fan cowl 14, all surrounded by a nacelle 16 including an inlet duct 18 extending forwardly of fan cowl 14 to direct air into the fan and inlet of engine 12. Inlet duct 18 has a rounded nose portion 20 followed by an airfoil shaped region 22, configured to limit turbulence and the resulting degradation of fan performance during the crucial take-off portion of flight. This airfoil is, thus, not optimized for cruise flight, so that turbulent flow, with high drag, occurs over much of the nacelle 16 during engine cruise operation.

The after end of nacelle 16 forms an exhaust duct 24, generally with a thrust reverser mechanism at 26. Exhaust from the core stream central turbine engine passes out of primary nozzle 28 between core cowl 30 and the engine center body 32.

Suction ducting 34, flutes 44, and other components of the laminar flow control arrangement, as detailed in FIG. 2, are located within inlet duct 18. The suction pumping system 36 including pumps 36a and for the laminar flow control arrangement and other engine accessories may be mounted at any suitable position, such as within the lower portion of fan cowl 14. Any suitable conventional suction or vacuum pumps may be used.

Details of the laminar flow control arrangement are provided in FIG. 2 which shows a schematic detail section of the forward portion of nacelle 16.

Nose section 20 typically houses an anti-icing system. Bulkhead 37, which is ordinarily arranged approximately perpendicular to the nacelle centerline, may be canted forward at the top so as to permit the bonded-together assembly of microporous outer skin 38, honeycomb 40 and perforated inner skin 42 to extend as far forward as possible.

The porous skin 38 can be formed from any suitable material, such as aluminum, composites having high strength fibers in a resin matrix, titanium or stainless steel. Optimum results are obtained with a graphite fiber reinforced epoxy skin material. Typically, the micropores of skin 38 may be formed by laser drilling or electron beam drilling. For optimum results, a graphite epoxy skin 38 having a thickness of from about 0.025 to 0.45 inch is preferred. Preferably, the micropores should have diameters of from about 0.001 to 0.004 inch, on about a 0.004 to 0.05 inch spacing. Best results are obtained with pore diameters of about 0.002 inch on a 0.025 inch square pattern.

Any suitable honeycomb material having the desired strength and stiffness characteristics may be used. Typically, the honeycomb core 40 may have a thickness of from about 0.25 to 1.0 inch and a cell diameter of from about 0.25 to 0.75 inch and may be formed from aluminum, titanium or known alloys of these metals. Preferably, the core has a thickness of about 0.5 inch with a cell diameter of about 0.375 inch.

The perforated back skin 42 may be formed from any suitable material, such as aluminum, high strength fiber reinforced or synthetic resins. The skin 42 typically has a thickness of from about 0.025 to 0.045 inch. Preferably, the perforations in skin 42 have diameters of from about 0.05 to 0.15 inch and are substantially uniformly spaced with an about 0.06 to 0.25 inch center-to-center spacing. For optimum results, the perforations have diameters of about 0.1 inch, on an about 0.15 inch spacing with a square pattern.

Suction ducting 34 includes a plurality of circumferential flutes 44 bonded to back skin 42. While it is important that most of the forward outer surface of nacelle 16 be covered with the microporous surface, and that suction through that surface be reasonably uniform, narrow bands 46 where flutes 44 are bonded to back skin 42 do not interfere with effective laminar flow control. For best results, the bands 46 should have widths of no greater than 2.0 inches.

At least one section of the duct 34 defined by walls 48 connects to all flutes 44 and suction pump 36 (not seen in FIG. 2). Duct 34 walls 48 and flutes 44 may be formed from any suitable material such as aluminum or advanced organic composites. The duct (or ducts) 34 may have any suitable diameter, with the combined diameters sufficient to keep flow through the duct(s) below about Mach 0.2.

In a typical nacelle 16, a pivotable fan cowl door 50 or the like is located in the fan cowl region 14. Door 50 pivots about a hinge 52. A small gap 54 necessarily results where the skin of door 50 meets the nacelle skin. This gap will cause laminar flow separation and turbulence, disrupting the laminar flow along nacelle 16 that normally will extend well aft of the aft end of microporous skin 38. To prevent this problem with gap 54, a circumferential chamber 56 is provided with a plurality of holes 58 communicating with gap 54. At least one suction tube 60 connects chamber 56 to pump or pumps 36. The number and sizes of holes 58 and the sizing of tube 60 will depend upon the width of gap 54, and will be preferably selected to maintain flow through tube 60 at below Mach 0.2.

While a single pump could be used with both ducts 48 and tube 60, because of the different pressure ratios needed in each of these, for best results two pumps are used in pumping system 36. The first pump provides suction to the nacelle inlet porous skin 38 which requires a higher pressure ratio. The second pump combines the exhaust from the first pump with the suction flow from tube 60 and then boosts the pressure of the total suction flow before exhausting the flow. While the pump output could be simply dumped overboard, it is preferred that it be used for engine cooling or ventilation, or as an addition to the engine thrust. Pump system 36 can be located at any suitable location on the engine, such as at or near the engine gearbox.

FIG. 3 is a chart plotting drag coefficient against distance from the hi-lip or tip of the nose 20 for a nacelle 16 using and not using the laminar flow control arrangement of this invention, as calculated using a computer simulation. The simulation was based on a conventional large turbofan engine, operating in cruise mode at Mach 0.76 at an altitude of 35,000 ft. The plot of line 62, without suction, shows a dramatic increase in drag beginning about 3 feet back from the hi-lite of the nose. With suction, as shown by line 64, drag changes very little over the first 12 feet of the nacelle, and then rises only gradually. This decrease in drag can be expected to produce a significant fuel savings, even when adding the weight of the laminar flow control arrangement to each engine. Under the conditions and the nacelle configuration evaluated, without suction, transition from laminar flow to turbulent flow begins about 3 feet from the nose, while with suction (which ends about 7 feet aft) the boundary layer remains laminar until about 12 feet aft.

Other applications, variations and ramifications of this invention will occur to those skilled in the art upon reading this disclosure. Those are intended to be included within the scope of this invention, as defined in the appended claims.

We claim:

1. A laminar flow control aircraft turbine engine nacelle arrangement which comprises:
   a microporous nacelle outer skin;
   a honeycomb core bonded to the inner surface of said nacelle skin;
   a perforated back skin bonded to said core;
   a plurality of closely spaced circumferential flutes open to said back skin and fastened thereto;
   at least one longitudinal collector duct operatively connected to said flutes; and
   suction pump means for drawing air from said collector duct;
   whereby air is drawn through said microporous skin, core, skin, flutes and collector duct to maintain laminar air flow over said outer skin during aircraft operation.

2. The arrangement according to claim 1 which further includes a chamber within said nacelle adjacent to and communicating with gaps in the nacelle skin, said chamber connected in fluid flow relationship to said suction pump means whereby air is drawn through said gaps during aircraft operation.

3. The arrangement according to claim 2 wherein said suction pump means includes two pumps, a first pump receiving air from said duct and a second pump receiving exhaust from said first pump and air from said chamber and boosts the pressure of the total suction flow.

4. The arrangement according to claim 1 wherein the ratio of normal velocity through the microporous surface to the freestream velocity along the outer skin in a range of 0.0001 to 0.0004.

5. The arrangement according to claim 1 where the flow rate in said duct is maintained below about 0.2 Mach.

6. The arrangement according to claim 1 wherein the suction pump system exhaust is directed into the nacelle ventilation and cooling system.

7. The arrangement according to claim 1 wherein said outer skin is formed from a graphite fiber reinforced epoxy resin and the pores have diameters of about 0.002 inch on a 0.025 inch square spacing.

8. The arrangement according to claim 1 wherein said back skin is formed from a graphite fiber reinforced epoxy resin and the perforations have diameters of about 0.1 inch on a 0.15 inch square pattern.

9. A laminar flow control aircraft turbine engine nacelle arrangement which comprises:
   a microporous nacelle outer skin;
   a honeycomb core bonded to the inner surface of said nacelle skin;
   a perforated back skin bonded to said core;
   a plurality of closely spaced circumferential flutes open to said back skin and fastened thereto;
   at least one longitudinal collector duct operatively connected to said flutes;
   at least one chamber in said nacelle in fluid flow communication with at least one gap in the skin of said nacelle;
   at least one collector tube operatively connected to said chamber; and
   suction pump means for drawing air from said duct and tube;
   whereby air is drawn through said microporous skin, core, skin, flutes and collector duct and through said gap, chamber and tube to maintain laminar air flow over the forward portion of said nacelle during aircraft operation.

10. The arrangement according to claim 9 wherein said suction pump means includes two pumps, a first pump receiving air from said duct and a second pump receiving exhaust from said first pump and air from said tube and boosts the pressure of the total suction flow.

11. The arrangement according to claim 9 wherein the ratio of normal velocity through the microporous surface to the freestream velocity along the outer skin is from about 0.0001 to 0.0004.

12. The arrangement according to claim 9 where the flow rate in said duct is maintained below about 0.2 Mach.

13. The arrangement according to claim 9 wherein the suction pump system exhaust is directed into the nacelle ventilation and cooling system.

14. The arrangement according to claim 9 wherein said outer skin is formed from a graphite fiber reinforced epoxy resin and the pores have diameters of about 0.002 inch on a 0.025 inch square spacing.

15. The arrangement according to claim 9 wherein said back skin is formed from a graphite fiber reinforced epoxy resin and the perforations have diameters of about 0.1 inch on a 0.15 inch square pattern.

* * * * *